United States Patent
Ueda et al.

(10) Patent No.: US 9,475,194 B2
(45) Date of Patent: Oct. 25, 2016

(54) AUTONOMOUS MOBILE DEVICE, AUTONOMOUS MOVEMENT SYSTEM, AND AUTONOMOUS MOVEMENT METHOD

(75) Inventors: Taishi Ueda, Tokyo (JP); Ryosuke Nakamura, Tokyo (JP); Azusa Amino, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/396,887

(22) PCT Filed: Apr. 26, 2012

(86) PCT No.: PCT/JP2012/061211
§ 371 (c)(1),
(2), (4) Date: Oct. 24, 2014

(87) PCT Pub. No.: WO2013/161033
PCT Pub. Date: Oct. 31, 2013

(65) Prior Publication Data
US 2015/0105906 A1   Apr. 16, 2015

(51) Int. Cl.
*B25J 9/16* (2006.01)
*G05D 1/02* (2006.01)

(52) U.S. Cl.
CPC ............ *B25J 9/1676* (2013.01); *G05D 1/024* (2013.01); *Y10S 901/01* (2013.01); *Y10S 901/40* (2013.01); *Y10S 901/46* (2013.01)

(58) Field of Classification Search
CPC ............... G05D 1/024; G05D 1/0289; G05D 2201/0213; G01S 17/93; G01S 17/936; G08G 1/16; B25J 9/1676; B25J 9/1666
See application file for complete search history.

(56) References Cited

U.S. PATENT DOCUMENTS

2010/0106356 A1*  4/2010  Trepagnier ............ G01S 17/023
701/25

FOREIGN PATENT DOCUMENTS

| JP | 5-297944 A | 11/1993 |
|---|---|---|
| JP | 9-185412 A | 7/1997 |
| JP | 2005-288657 A | 10/2005 |
| JP | 2008128938 A | * 6/2008 |
| JP | 2008-200770 A | 9/2008 |
| JP | 2009-157615 A | 7/2009 |
| JP | 2010-134855 A | 6/2010 |

OTHER PUBLICATIONS

Machine translation of the Detailed Description section of JP 2008128938A.*

* cited by examiner

*Primary Examiner* — Abby Lin
(74) *Attorney, Agent, or Firm* — Baker Botts L.L.P.

(57) ABSTRACT

An autonomous mobile device, an autonomous movement system, and an autonomous movement method, each having an obstacle avoidance capability, are provided. The autonomous mobile device includes an avoidance pattern determination unit for determining the travel pattern of the local device according to the state of motion, relative to the autonomous movement device, of a mobile obstacle other than the autonomous movement device; and a travel controller for causing the autonomous movement device to travel according to the travel pattern determined by the avoidance pattern determination unit. One of avoidance patterns is selected in accordance with a relative velocity to a mobile obstacle.

10 Claims, 10 Drawing Sheets

FIG.4A $\|vc\| - \|vr\| > \alpha$ : Pattern A

FIG.4B

$\|vc\| - \|vr\| < \beta$ : Pattern B

FIG.4C $\beta \leq \|vc\| - \|vr\| \leq \alpha$ : Pattern C $\|vc\| - \|vra\| > \alpha$

AUTONOMOUS MOBILE DEVICE, AUTONOMOUS MOVEMENT SYSTEM, AND AUTONOMOUS MOVEMENT METHOD

TECHNICAL FIELD

The present invention relates to technologies of an autonomous mobile device, an autonomous movement system, and an autonomous movement method, each having an obstacle avoidance capability.

BACKGROUND ART

Patent Document 1 discloses an autonomous mobile device having an obstacle avoidance capability. The technology disclosed in the Patent Document 1 is that a region where entrance of the autonomous mobile device is restricted (an entry invalidating region) is set in a space where an obstacle can move. The autonomous mobile device moves so as to avoid the entry invalidating region.

Patent Document 2 is also disclosed. Patent Document 2 discloses that the autonomous mobile device determines whether an obstacle is a human being or not when detecting the obstacle. When the obstacle is a human being, the autonomous mobile device stops and stands by for a predetermined period. When there is still the obstacle after elapse of the predetermined period, the autonomous mobile device shifts to an avoidance operation, and when there is no obstacle, restarts traveling.

PRIOR ART

Patent Document

Patent Document 1: JP2009-157615 A
Patent Document 2: JP 09-185412 A

SUMMARY OF INVENTION

Problem to be Solved by Invention

If an autonomous mobile device moves on the same path facing a mobile obstacle autonomously moving, such as the human being, when the autonomous mobile device performs an avoidance behavior to avoid a collision with the mobile obstacle, both face each other again after avoidance of the facing object in the same direction, and then may pause in a status of facing each other (hereinafter this status is referred to as same stepping). Such a same stepping frequently occurs in crowded situations at hospitals, stations, etc. Accordingly, at such places, there is a problem in that it takes a long time for the autonomous mobile device to reach a destination because the movement of the autonomous mobile device is remarkably interfered. Accordingly, there is a new problem for efficient movement by suppressing the same stepping.

For example, as described above, there is the technology disclosed in the Patent Document 1 in which all regions to which the mobile obstacle may move are set as the entry restricted area where the autonomous mobile device may enter. However, in this technology, the entry restricted area tends to be set broadly because of no prediction of the avoidance behavior of the facing object. Accordingly, it becomes difficult for the autonomous mobile device to move there because the advancing course for the autonomous mobile device is closed by the entry restricted areas. In other words, in the technology of Patent Document 1 the course is closed by the entry restricted regions around the mobile obstacle under a crowded circumstance, so that the autonomous mobile device cannot move.

Accordingly, in the crowded environment or a narrow path, it is desirable to perform avoidance only when necessary in accordance with behavior of the facing object. As the method of performing avoidance at a necessary time, for example, there is a technology in which the autonomous mobile device waits for a predetermined period until the facing object leaves when the obstacle is a mobile obstacle that autonomously moves like the technology of Patent Document 2. However, when the facing object is a mobile obstacle having such a high motor ability that the facing object can move speedier than the autonomous mobile device, the inventors confirmed that it is rather efficient to wait until the facing object stands aside than avoidance of the facing object by the autonomous mobile device. On the other hand, when the facing object is a mobile obstacle having a poor motor ability such as a person having difficulty in walking, it becomes inefficient when the autonomous mobile device waits until the facing object moves. Particularly, in the crowded environment such as hospitals, stations, etc., waiting frequently occurs until the facing object moves, so that it takes long time for the autonomous mobile device to reach its destination. Accordingly, it is desirable to consider a motor ability of the facing object for the determination whether the avoidance is necessary.

The present invention has been developed in consideration of the above-described background and aims to decrease a frequency of the same stepping.

Means for Solving Problem

To solve the problem, the present invention is characterized by including: an avoidance pattern determining unit configured to determine whether or not the autonomous mobile device oneself avoids a mobile obstacle which is different from the autonomous mobile device and determine one's own travelling pattern in accordance with a motion status of the mobile obstacle relative to the autonomous mobile device; and a travelling control unit configured to cause the autonomous mobile device to travel in accordance with the travelling pattern determined by the avoidance pattern determining unit.

Advantageous Effect of Invention

According to the present invention, the number of times of the same stepping can be reduced.

BRIEF DESCRIPTION OF DRAWINGS

FIGS. 10A and 10B are illustrations illustrating a detailed method of acquiring a position and a velocity of the mobile obstacle according to the second embodiment in which FIG. 10A shows a grid and FIG. 10B shows regions occupied by the obstacles assigned to the grids.

MODES FOR CARRYING OUT INVENTION

Next, modes for carrying out the invention (referred to as embodiments) are described with reference to drawings. In each of the drawings, the same components are designated with the same references and their description will be omitted.

First Embodiment

A first embodiment according to the present invention will be described with reference to FIGS. 1 to 5.
[Functional Block Diagram]

Figure 1:
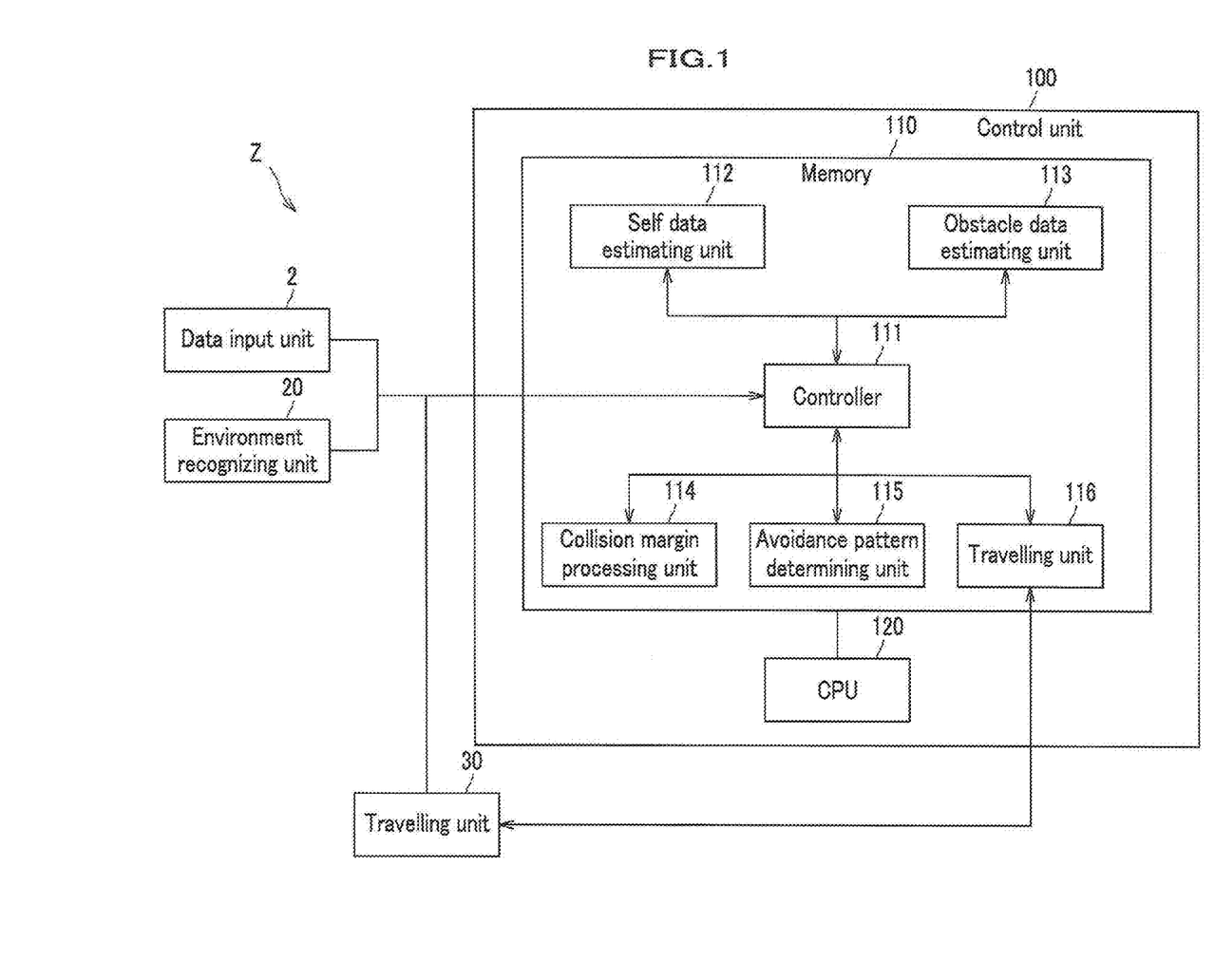
FIG. 1 is a functional block diagram of an autonomous movement system according to a first embodiment.

FIG. 1 is a functional block diagram of an autonomous movement system according to the first embodiment.

An autonomous movement system Z includes a control unit 100, a data input unit 2, an environment recognizing unit data input unit 200, and a travelling unit 30. Out of these units, the environment recognizing unit 20 and the travelling unit 30 will be described with reference to FIGS. 2A and 2B later.

The control unit 100 includes a memory 110, and a CPU (Central Processing Unit) 120. The respective programs of a controller 111, a self data estimating unit 112, an obstacle data estimating unit 113, a collision margin processing unit 114, an avoidance pattern determining unit 115, and a travelling control unit 116 are spread in the memory 110, and the CPU 120 executes the respective programs. Further, the memory 110 stores map data, data of a target position, one's own position, a travelling parameter of the autonomous mobile device oneself, and data of an obstacle.

The controller 111 controls the respective parts of 112 to 116. Further, the controller 111 controls the travelling unit 30 on the basis of data from the data input unit 2, the environment recognizing unit 20, and the travelling unit 30.

A self data estimating unit 112 estimates one's own position and one's own velocity. More specifically, the self data estimating unit 112 calculates current coordinates, a current direction, an advancing velocity, and a turning velocity of an autonomous mobile device 1 to store the data in the memory 110, The obstacle data estimating unit 113 estimates a position and a velocity of a mobile obstacle. More specifically, the obstacle data estimating unit 113 calculates the position and the velocity of the obstacle on the basis of time history of the distance data points Ok (k=1, 2, 3, - - -, n: n being the number of shape point train obtained by one time laser scanning) to the obstacle, stored in the memory 110 from the environment recognizing unit 20. The obstacle data estimating unit 113 estimates the velocity of the mobile obstacle by the method disclosed in, for example, JP2008-65755. In this method, the obstacle data estimating unit 113 detects rapidly changing point with respect to angle at a distance value obtained from a LIDAR (Laser Imaging Detection and Ranging) 21 at time t. A data train is divided into respective groups of consecutive points as segments, which are stored in the memory 110. More specifically, the obstacle data estimating unit 113 groups a shape point train on the basis of the rapidly changing points of the distance value. The shape point train is grouped into a segment.

Accordingly, the obstacle data estimating unit 113 can recognize characteristic quantities such as representative centers of respective weight points and shapes of respective segments at time t. Next, the obstacle data estimating unit 113 performs calculation at time t+$\Delta$t similarly to acquire the characteristic quantities of respective segments. The obstacle data estimating unit 113 compares the characteristic quantities of the segments acquired at time t with the characteristic quantities of the segments acquired at time t+t and recognizes segments having near values of the characteristic quantities as the same obstacle. Further, the obstacle data estimating unit 113 estimates the velocity of the obstacle from a variation quantity of the representative position of respective segments recognized as the same obstacle. The obstacle data estimating unit 113 presumes an obstacle having a travelling velocity of substantially "0" as a stationary obstacle and other obstacle as mobile obstacles. Further, the obstacle data estimating unit 113 calculates velocities vck (vectors) of distance data points Ok within the same segment and attaches the data and stores the calculated velocities in the memory 110.

Figure 5A:
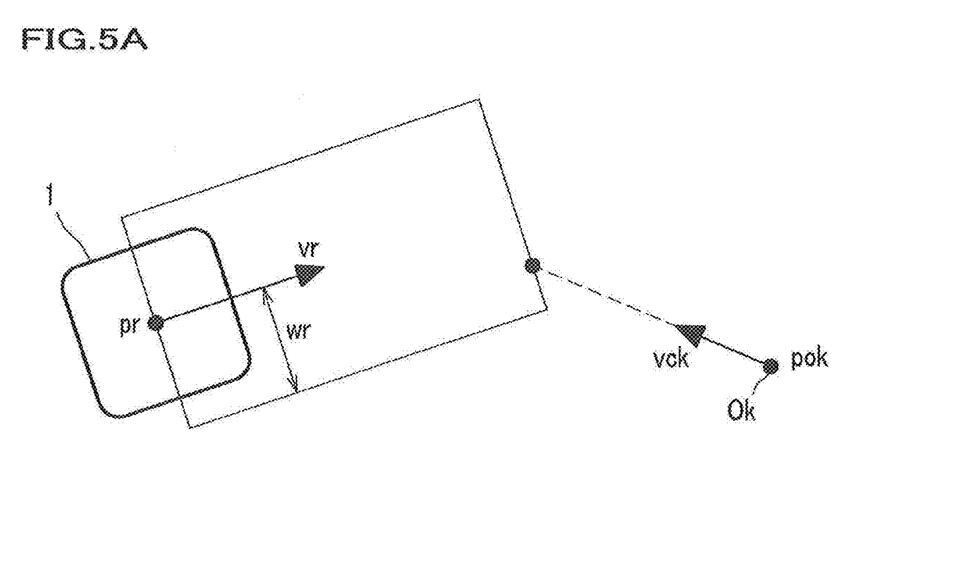
FIGS. 5A and 5B are drawings showing a detailed method of calculating a collision margin.
Figure 5B:
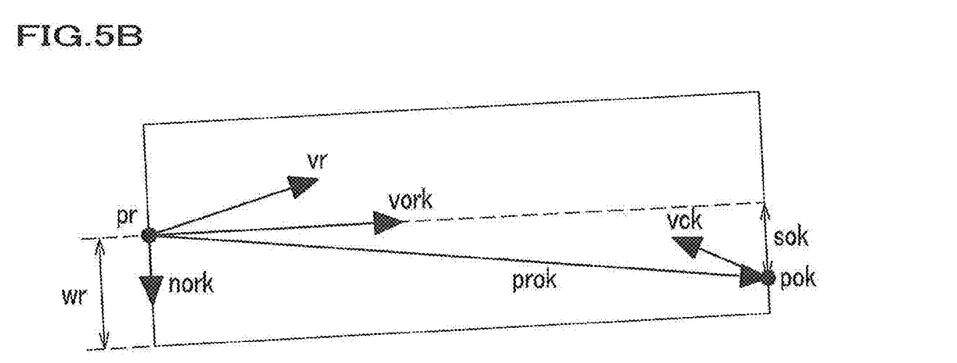

The collision margin processing unit 114 calculates a collision margin between the autonomous mobile device 1 and obstacles on the basis of the data of oneself and the data of the mobile obstacles stored in the memory 110. Further, the collision margin processing unit 114 quantitatively determines a margin of collision with mobile obstacle on the basis of the calculated collision margins. Further, the collision margin processing unit 114 determines whether the current travelling status is maintained or emergency avoidance is performed on the basis of the collision margin. Calculation of the collision margin will be described later with reference to FIG. 5. More specifically, the collision margin is, for example, time up to collision of the autonomous mobile device 1 with the mobile obstacle.

The avoidance pattern determining unit 115 determines a countermeasure (avoidance pattern) on the basis of the velocity of the autonomous mobile device 1 oneself and the velocity of the mobile obstacle.

The travelling control unit 116 calculates control signals for providing the travelling status and the avoidance pattern determined by the avoidance pattern determining unit 115 and transmits the result to the travelling unit 30.

While the autonomous mobile device 1 is operating, the input data from the data input unit 2, the environment data from the environment recognizing unit 20, travelling data from the travelling unit 30, and calculation results of the respective units 112 to 116 in the control unit 100 are always inputted into the memory 110 for recoding and updating.

The data input unit 2 is a device for inputting the map data and a target point from the external.

The travelling unit 30 is a device for travelling the autonomous mobile device 1 and will be described later with reference to FIG. 2.
[General Views]

Figure 2A:
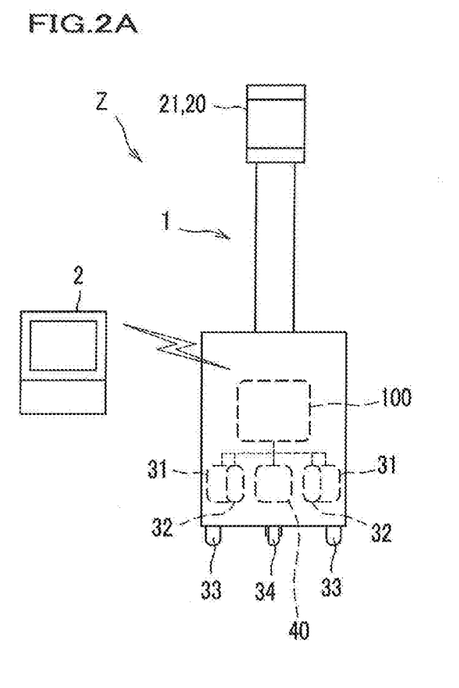
FIGS. 2A and 2B are general views of an autonomous movement system according to the first embodiment.
Figure 2B:
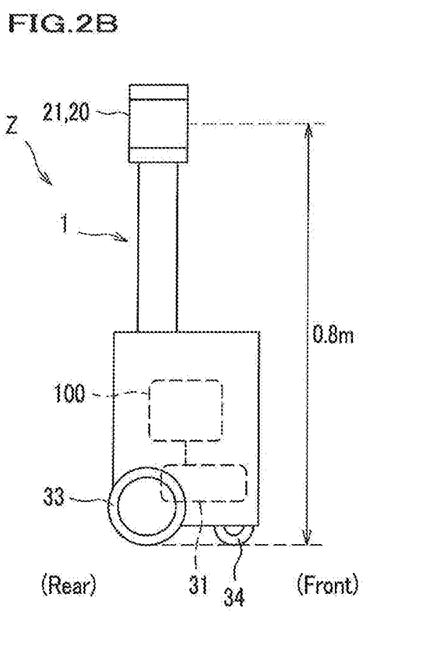

FIGS. 2A and 2B are general views of an autonomous movement system according to the first embodiment. FIG. 2A is a front view of the autonomous mobile device and the data input unit 2. FIG. 2B is a side view of the autonomous mobile device. In FIGS. 2A and 2B, the same components as those in FIG. 1 are designated with the same references and their description are omitted.

The autonomous movement system Z includes the autonomous mobile device 1 for performing the autonomous travelling and the data input unit 2 for inputting data into the autonomous mobile device 1 through radio wave LAN (Local Area Network) communication, etc. The data input unit 2 has been described upon describing FIG. 1. Accordingly the description of the data input unit 2 in FIG. 2 is omitted.

As shown in FIG. 2, the autonomous mobile device 1 includes the environment recognizing unit 20, the control unit 100, motors 31, encoders 32, driving wheels 33, a free-direction type of caster 34, and a battery 40. Out of these units, the control unit 100 has been described in detail upon describing FIG. 1. Accordingly, the description of the control unit 100 is omitted.

The environment recognizing unit 20 is a device for recognizing other objects and geographical features which is the LIDAR (Laser Imaging Detection and Ranging) 21 in the first embodiment. The LIDAR 21 acquires a data point Ok at a distance to an obstacle measured at a predetermined regular angular interval as the environment data and stores the data as a time history recorded at each predetermined period. In the present embodiment, when an obstacle is described simply as "obstacle", the obstacle is a stationary obstacle and a mobile obstacle. When only an obstacle traveling is described, the obstacle is described as a mobile obstacle. A height of a scanning plane of the LIDAR 21 is preferably about 0.8 m from the ground so that the plane passes through near the pelvis of a human being. However, the height is not limited to this.

The motors 31 are installed on a bottom of the body of the autonomous mobile device 1 independently between right and left sides. The encoders 32 measure rotational speeds of the left and right motors 31.

The driving wheels 33 are driven by the motors 31 to travel the autonomous mobile device 1 in forward and rearward directions.

The caster 34 can rotate in all directions and help the autonomous mobile device 1 to perform a turning operation.

The control unit 100 performs forward and turning operations for the autonomous mobile device 1 by independently control the rotational speeds of the left and right driving wheels 33. Current values of the rotational speeds of the motors from the encoders 32 are always transmitted to the control unit 100 in operation and stored as a time history of the motor rotational speeds for past several seconds in the memory 110.

The battery 40 is a unit for supplying an electric power to the environment recognizing unit (LIDAR) 20, the control unit 100, respective parts 31 to 34, etc.

[Flowchart]

Figure 3:
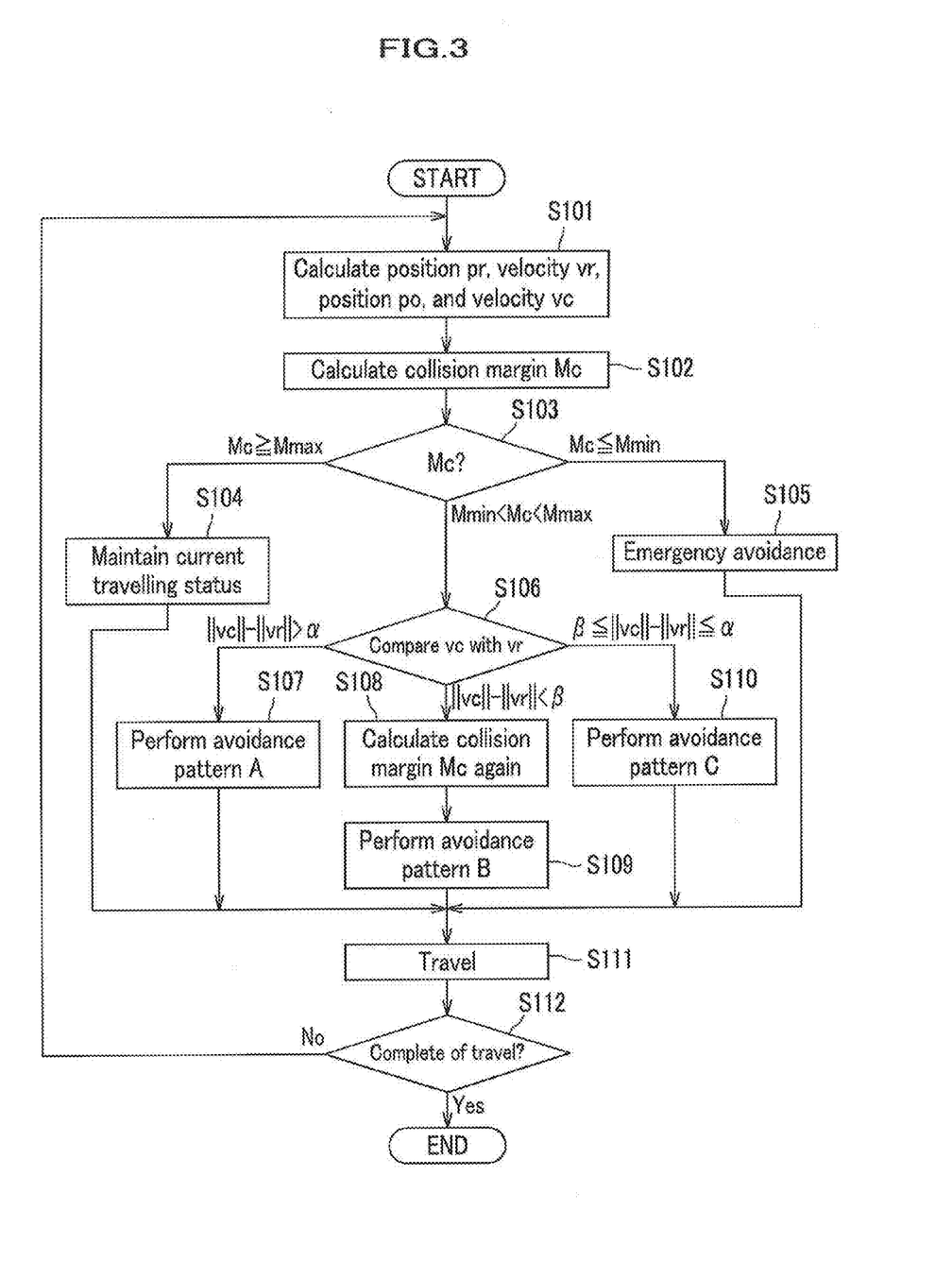
FIG. 3 is a flowchart illustrating a processing procedure of the autonomous mobile device according to the first embodiment.

FIG. 3 is a flowchart illustrating a processing procedure of the autonomous mobile device according to the first embodiment.

First, absolute coordinates or relative coordinates of a final destination is inputted to the autonomous mobile device 1 through the data input unit 2. When a start of the operation of the autonomous mobile device 1 is instructed through the data input unit 2 at a given timing, the following process is started.

When the process is started, the self data estimating unit 112 calculates one's own position pr, one's own velocity vr, a position of distance data point (position of a mobile obstacle) po, and a velocity vc of the mobile obstacle (S101). The collision margin processing unit 114 obtains from the memory 110 the one's own position pr, the velocity of the mobile obstacle vc, the position of distance data point (position of the mobile obstacle) po, and the velocity of the mobile obstacle vc (S101). The references vc and vr are vectors. Hereinafter, it is assumed that velocities other than the velocity of the mobile obstacle vc, and the one's own velocity vr are also vectors.

Next, the collision margin processing unit 114 calculates a collision margin Mc (S102) and compares the calculated collision margin Mc with respective thresholds Mmax, Mmin (Mmax>Mc>Mmin) (S103).

As the result of a step S103, when Mc Mmax, i.e., (S103→Mc Mmax), the collision margin processing unit 114 determines that there is sufficient margin up to a collision of the autonomous mobile device 1 with the mobile obstacle, and maintains the current travelling status (S104), and processing proceeds to a step S111.

As the result of the step S103 when Mc Mmin, i.e., (S103→Mc Mmin), the collision margin processing unit 114 determines that there is no margin up to the collision. Then, the collision margin processing unit 114 causes the travelling control unit 116 to perform an emergency avoidance (S105), and then, processing proceeds to a step S111. The emergency avoidance includes a stop, a rapid turning, etc. and which avoidance operation is to be made is previously set.

As the result of the step 103, when Mmin<Mc<Mmax, i.e., (S103→Mmin<Mc<Mmax), the avoidance pattern determining unit 115 compares the velocity of the mobile obstacle $\|vc\|$ with the one's own velocity $\|vr\|$ of the autonomous mobile device 1 (S106). The symbol $\|\cdot\|$ is a norm of a vector. Further, in the below comparison, a relation between determination thresholds $\alpha$ and $\beta$ is $\beta<0<\alpha$.

As the result of the step S106, when $\|vc\|-\|vr\|>\alpha$, i.e., (S106→$\|vc\|-\|vr\|>\alpha$), the avoidance pattern determining unit 115 cause the travelling control unit 116 to perform an avoidance pattern A (S107), and the controller 111 proceeds to a process in a step S111. The avoidance pattern A will be described later with reference to FIGS. 4A to 4C.

As the result of the step S106, when $\|vc\|-\|vr\|<\beta$, i.e., (S106→$\|vc\|-\|vr\|<\beta$), the avoidance pattern determining unit 115 calculates the collision margin Mc again (S108). The avoidance pattern determining unit 115 causes the travelling control unit 116 to perform an avoidance pattern B (S109) on the basis of the margin M calculated again, and the controller 111 proceeds to a process in the step S111. The avoidance pattern B is described latter with reference to FIG. 4.

As the result of the step S106, when $\beta\|vc\|-\|vr\|\alpha$, i.e., (S106→$\beta\|vc\|-\|vr\|\alpha$), the avoidance pattern determining unit 115 causes the travelling control unit 116 to perform an avoidance pattern C (S107), and then, the controller 111 proceeds to a process in a step S111. The avoidance pattern C will be described later with reference to FIGS. 4A to 4C.

After steps S104, S105, S107, S109, and S110, the travelling control unit 116 causes the autonomous mobile device 1 to travel in accordance with the determined the avoidance pattern (S111).

The travelling control unit 116 determines whether travelling has been finished (S112). More specifically, the travelling control unit 116 determines whether the autonomous mobile device 1 has reached the final destination point.

As the result of the step S112, when the travelling has not been completed (S112→No), the controller 111 returns to the process of the step S101.

As the result of the step S112, when the travelling has been completed (S112→Yes), the controller 111 finishes the processing.

[Avoidance Pattern]

Figure 4A:
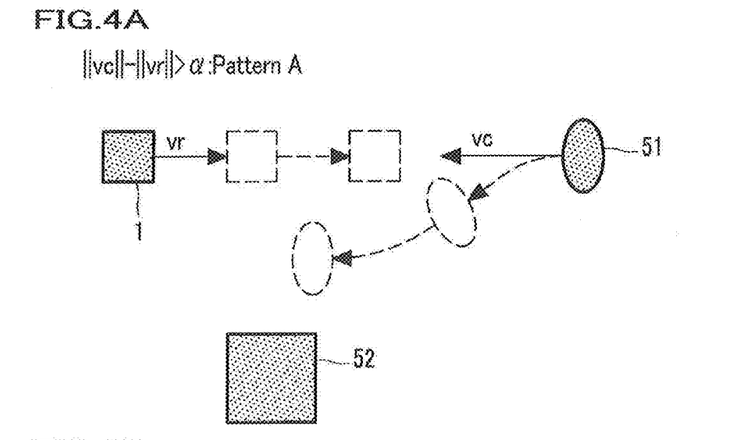
FIGS. 4A to 4C are drawings showing examples of avoidance patterns.
Figure 4B:
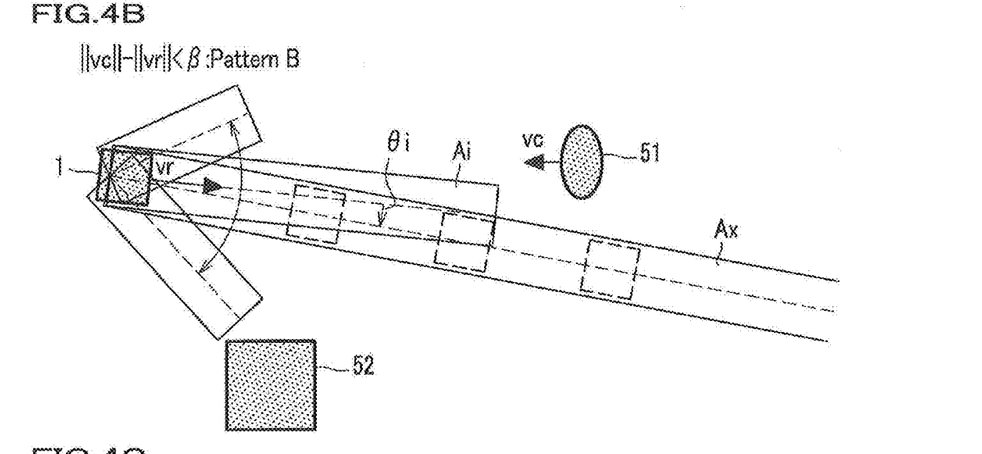
Figure 4C:
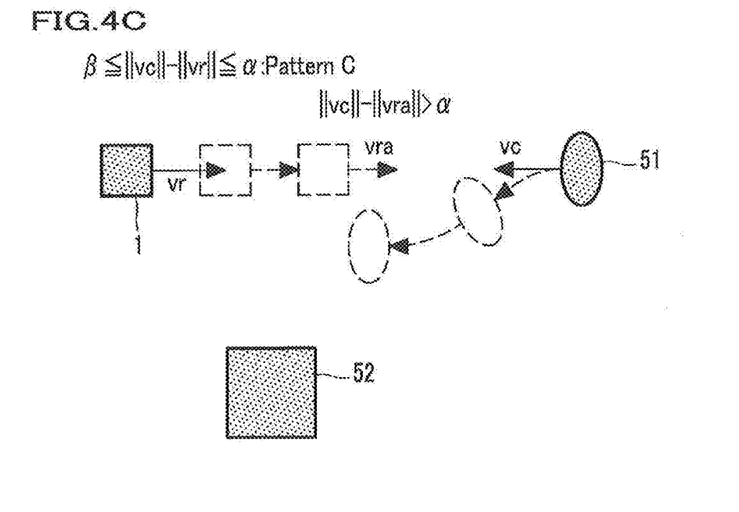

FIGS. 4A to 4C are drawings showing examples of avoidance patterns. These avoidance patterns are based on a tendency, found by the inventors, that a moving object having a higher velocity performs the avoidance at a higher probability. This is based on presumption that a moving object having a low velocity is probably an aged person or a handicapped person.

In FIGS. 4A to 4C, as described above, "vc" is a velocity of the mobile obstacle and "vr" is a velocity of one's own velocity of the autonomous mobile device 1. Further, a reference 51 denotes a mobile obstacle, and a reference 52 denotes a stationary obstacle.

($\|vc\|-\|vr\|>\alpha$: Avoidance Pattern A)

FIG. 4A is a drawing showing an example of the avoidance pattern A, when $\|vc\|-\|vr\|>\alpha$. In other words, FIG. 4A shows an example of the avoidance pattern A executed in the step S107 in FIG. 3.

The condition is $\|vc\|-\|vr\|>\alpha$ means that $\|vc\|$ is larger than $\|vr\|$, and the difference is larger than a high velocity determination threshold $\alpha$. In this case, the avoidance pattern determining unit 115 estimates that a motor ability of the mobile obstacle is high.

Accordingly, the avoidance pattern determining unit 115 determines that it has a higher probability that a mobile obstacle 51 previously performs a travelling direction change to avoid a collision. In other words, the avoidance pattern determining unit 115 determines that there is a probability that when the autonomous mobile device 1 performs the travelling direction change, there is a high probability that the autonomous mobile device 1 do the same stepping because the travelling directions are overlapped with the mobile obstacle 51 again. Then, the avoidance pattern determining unit 115 causes the travelling control unit 116 to performs "maintaining the current motion direction and velocity", as shown in FIG. 4A as the avoidance pattern A.

More specifically, when the autonomous mobile device 1 faces the mobile obstacle 51 satisfying the condition of $\|vc\|-\|vr\|>\alpha$ (i.e., the velocity is sufficiently higher than that of the mobile obstacle 51 oneself), the avoidance pattern determining unit 115 continues to maintain the current motion status (velocity and motion direction) until the collision margin Mc becomes lower than Mmim. During this, when the mobile obstacle 51 performs a travelling direction change, the collision can be avoided. In such a manner, the autonomous mobile device 1 and the mobile obstacle 51 can rapidly pass by one another.

($\|vc\|-\|vr\|<\beta$: the Avoidance Pattern B)

FIG. 4B is a drawing showing an example of the avoidance pattern B, when $\|vc\|-\|vr\|<\beta$. In other words, FIG. 4B shows an example of the avoidance pattern B executed in the step S109 in FIG. 3.

The condition is $\|vc\|-\|vr\|<\beta$, which means that $\|vc\|$ is smaller than $\|vr\|$, and the difference is larger than a low velocity determination threshold $\beta$. In this case, the avoidance pattern determining unit 115 estimates that the motor ability of the mobile obstacle 51 is low.

Accordingly, the avoidance pattern determining unit 115 determines that it has a low probability that the mobile obstacle 51 immediately performs a travelling direction change to avoid a collision. In other words, the avoidance pattern determining unit 115 determines that when the autonomous mobile device 1 immediately performs the travelling direction change, the autonomous mobile device 1 can avoid the collision. Then, the avoidance pattern determining unit 115 causes a collision margin travelling control unit 116 to perform "a turn having a larger Mc calculated margin MC again in the step S109" as shown in FIG. 5B.

Here, in the case that the avoidance pattern determining unit 115 maintains a current motion direction and the current velocity, a region where the autonomous mobile device 1 presumably passes up to the collision with the mobile obstacle 51 is assumed as an estimated passing region Ai (i being a natural number and a number being designated with an angle). The longer the estimated passing region Ai in the travelling direction of the autonomous mobile device 1, the larger the collision margin Mc calculated again becomes. Then, the avoidance pattern determining unit 115 determines that the estimated passing region with respect to the current velocity is AO. The avoidance pattern determining unit 115 checks the collision margins Mc at a constant angle interval in an order having a smaller turning angle in a left turning direction and the right turning direction with a reference on AO. Next, the avoidance pattern determining unit 115 avoids the collision with the object by causing the travelling control unit 116 to turn the autonomous mobile device 1 in a turning direction $\theta i$ to the estimated passing region Ax having a value of the collision margin Mc larger than the predetermined constant value.

($\beta\|vc\|-\|vr\|\alpha$: Avoidance Pattern C)

FIG. 4C is a drawing showing an example of the avoidance pattern C, when $\beta\|vc\|-\|vr\|\alpha$. In other words, FIG. 4C shows an example of the avoidance pattern C executed in the step S110 in FIG. 3.

The condition is $\beta\|vc\|-\|vr\|\alpha$, which means that a difference $\|vc\|-\|vr\|$ between $\|vc\|$ and $\|vr\|$ is larger than a low velocity determination threshold $\beta$ and smaller than the high velocity determination threshold $\alpha$. In this case, the avoidance pattern determining unit 115 estimates that the motor ability of the mobile obstacle 51 is of the same degree as the motor ability of the autonomous mobile device 1.

Accordingly, the avoidance pattern determining unit 115 causes the travelling control unit 116 to perform "deceleration until the condition becomes $\|vc\|-\|vr\|>\alpha$ as shown in FIG. 5C. More specifically, the avoidance pattern determining unit 115 decelerates the autonomous mobile device 1 to allow the velocity of the mobile obstacle 51 to be relatively faster.

In other words, the avoidance pattern determining unit 115 decelerate one's own velocity to a velocity vra providing a condition of $\|vc\|-\|vra\|>\alpha$ when the autonomous mobile device 1 faces the mobile obstacle 51 (having substantially the same velocity) having a condition satisfying $\beta\|vc\|-\|vr\|\alpha$. This makes the velocity of the mobile obstacle 51 relatively faster to forcibly generate the condition of the avoidance pattern A.

By performing the above-described operation, the autonomous mobile device 1 can transmit one's own intention of no travelling direction change to the mobile obstacle 51, which urges the mobile obstacle 51 to perform avoidance by the travelling direction change. If the mobile obstacle 51 performs the travelling direction change to avoid the collision before the collision margin Mc becomes lower than Mmin, which is faster for the autonomous mobile device 1 than the case in which the autonomous mobile device 1 completely stops.

As described above, the motor ability of the mobile obstacle 51 is judged with the travelling velocity of one's own velocity of the autonomous mobile device 1, determines whether the autonomous mobile device 1 should avoid the facing object in accordance with the needs in order to avoid the same stepping and a collision due to avoiding the facing object in the same directions, so that the autonomous mobile device 1 capable of efficiently moving can be provided.

[Details of Calculation of the Collision Margin]

FIGS. 5A and 5B are drawings showing a detailed method of calculating a collision margin.

The collision margin processing unit 114 (see FIG. 1) calculates a margin M on the basis of the the one's own position pr and velocity vr, a position pok and a velocity of distance data point Ok of the mobile obstacle (both being shown in FIG. 5A) stored in the memory 110 (see FIG. 1). In the embodiment, the margin M is calculated on the basis of time up to the collision when both continue the current motions. The collision margin processing unit 114 determines quantitatively whether there is a margin up to the collision with the mobile obstacle on the basis of the collision margin. Here, "k" is a number in the shape point train observed by the LIDAR (Laser Imaging Detection and Ranging) 21 as described above. For example, M=(M1, M2, . . . , Mk, . . . ).

As shown in FIG. 5A, when it is assumed that a width, the position, and the velocity of the autonomous mobile device 1 are wr, pr, and vr, respectively, there is a data point Ok (one of shape point trains of the mobile obstacles) having a position pok and a velocity vck. In such a case, the collision margin processing unit 114 calculates using Eq. (1) a relative velocity vork and a normal vector nork of the relative velocity vork of the autonomous mobile device 1 with respect to relative positions prok, vck of the distance data point Ok relative to the pr shown in FIG. 4B.

$$prok = pok - pr$$

$$vork = vr - vck$$

$$\|nork\| = 1, \text{ and } nork \cdot vork = 0 \qquad (1)$$

Here, when a distance sok from the distance data point Ok at vork in a direction of the normal is smaller than wr, there is a possibility that the autonomous mobile device 1 collides with the distance data point Ok. However, in FIGS. 4A to 4C, wr is set to be wider than the width of the autonomous mobile device 1 in consideration of safety. The collision margin processing unit 114 assumes that a time period up to the collision is tk and calculates tk and sok by Eq. (2).

$$Tk = Vk^{-1} prok \qquad (2)$$

where $$Tk = \begin{bmatrix} tk \\ sok \end{bmatrix}, Vk^{-1} = [\, vork \quad nork \,]$$

Further, the collision margin processing unit 114 calculates a collision margin Mk from the calculated tk and sok as shown in Eq. (3).

$$Mk = \begin{cases} 0 & tk < t\min \cap sk \le wr \\ \dfrac{tk - t\min}{t\max - t\min} & t\min \le tk \le t\max \cap sk \le wr \\ 1 & tk > t\max \cup sk > wr \end{cases} \qquad (3)$$

Previously set are tmin and tmax so as to be preferable in accordance with the motion performance of the autonomous mobile device 1 and an environment, etc. For example, tmin is set to be time up to a stop of the autonomous mobile device 1 from the current velocity vr. Further, tmax is set as a period necessary for the autonomous mobile device 1 to reach a location having a maximum measurable distance of the LIDAR (Laser Imaging Detection and Ranging) 21 at one's own velocity vr.

The collision margin processing unit 114 calculates the collision margins Mk with all the distance data points Ok measured by the LIDAR (Laser Imaging Detection and Ranging) 21, and out of margins Mk, the minimum value is assumed to be the current final collision margin Mc.

The avoidance pattern determining unit 115 performs the process describe above on the basis of the calculated collision margin Mc, the velocity of the mobile obstacle vc (a velocity in the direction Mc out of the vck), and the velocity vr of the autonomous mobile device 1 and selects an optimal one is selected from a plurality of avoidance patterns (avoidance patterns A to C) set previously.

The travelling control unit 116 sends a driving voltage to the motor 31 according to a specification of the motor 31 in accordance with the avoidance pattern stored in the memory 110.

Further, in the embodiment, the collision margin is defined as time. However, it is also possible that a distance is defined as the collision margin.

According to the first embodiment, because the avoidance pattern can be changed in accordance with the velocity of the object facing one's own of the autonomous mobile device 1 (mobile obstacle), so that an appropriate avoidance can be performed. Particularly, when the facing object is faster than the autonomous mobile device 1 oneself, maintaining the one's own current moving status to have the facing object avoided, which prevents from the traveling period to the destination to extend.

Second Embodiment

Next, a second embodiment according to the present invention is described with reference to FIGS. 6 to 10.

Figure 6:
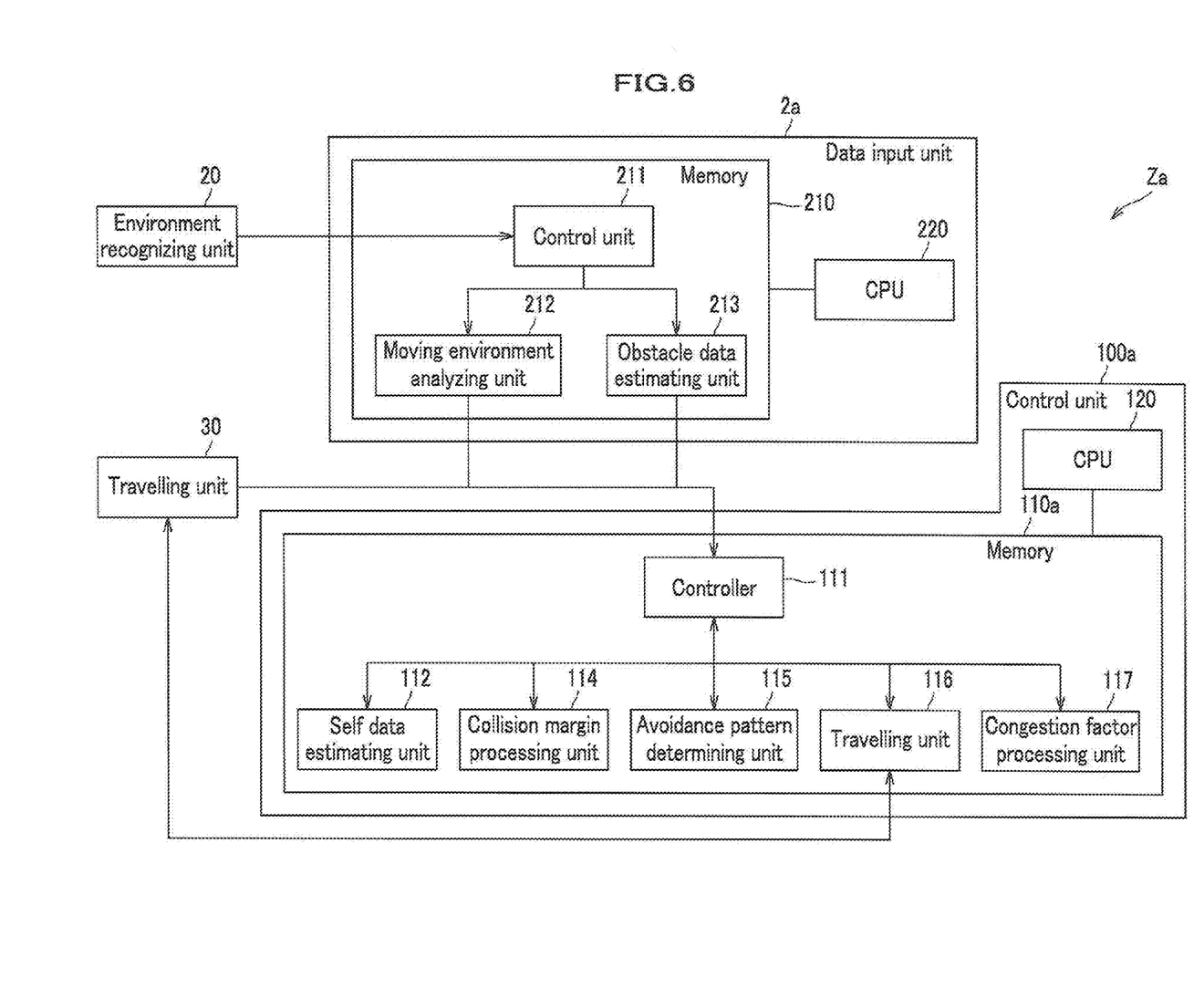
FIG. 6 is a functional block diagram of the autonomous movement system according to a second embodiment.

An autonomous movement system Za according to the second embodiment changes a parameter (thresholds α, β) of determining the avoidance pattern in accordance with a congestion factor.

[Functional Block Diagram]

FIG. 6 is a functional block diagram of the autonomous movement system according to the second embodiment.

The autonomous movement system Za includes a control unit 100*a*, the data input unit 2*a*, the environment recognizing unit 20, and the travelling unit 30.

Differences of the second embodiment from the autonomous movement system Z according to the first embodiment are as follows:

(a1) Data of the environment recognizing unit 20 is inputted into a data input unit 2*a*.

(a2) The respective programs of a control unit 211, a moving environment analyzing unit 212, and an obstacle data estimating unit 213 are spread in a memory 210 of the data input unit 2*a*, and a CPU 220 executes the respective programs. Processing results of the moving environment analyzing unit 212 and the obstacle data estimating unit 213 in the data input unit 2*a* are inputted into the control unit 100*a*.

(a3) In the first embodiment, the obstacle data estimating unit 213 provided in the control unit 100 is provided in the data input unit 2*a*.

(a4) A congestion factor processing unit 117 for performing a process regarding the congestion factor is executed on a memory 110*a* of the control unit 100*a*.

Hereinafter, the data input unit 2*a* and the congestion factor processing unit 117 are described. The controller 111, the self data estimating unit 112, the collision margin processing unit 114, the avoidance pattern determining unit 115, the travelling control unit 116, and the travelling unit 30 in the control unit 100*a* are the same as those in the first embodiment, and thus their descriptions are omitted.

In the memory 210 of the data input unit 2*a*, the programs of the control unit 211, the moving environment analyzing unit 212, and the obstacle data estimating unit 213 are spread and the CPU 220 executes the respective programs. Further, a time history of the environment data for past several seconds inputted from the environment recognizing unit 20 is stored in the memory 210.

The moving environment analyzing unit 212 calculates a ratio occupied by the obstacles in a captured image on the basis of the data in the memory 210 to calculate the congestion factor.

The obstacle data estimating unit 213 divides the obstacles into stationary obstacles and mobile obstacles by the method described above, and calculates and stores traveling velocities of the respective obstacles, etc. in the memory 110*a* of the control unit 100*a*.

In FIG. 6, the moving environment analyzing unit 212 and the obstacle data estimating unit 213 are provided in the data input unit 2*a*, but may be provided in the control unit 100*a*. The data of the environment recognizing unit 20 may be directly inputted into the control unit 100*a*. In other words, calculation of the congestion factor, traveling velocities of the obstacles, etc. may be performed in the control unit 100*a*.

The congestion factor processing unit 117 determines the threshold (described later) for determining the avoidance pattern in accordance with the calculated congestion factor.

Figure 7A:
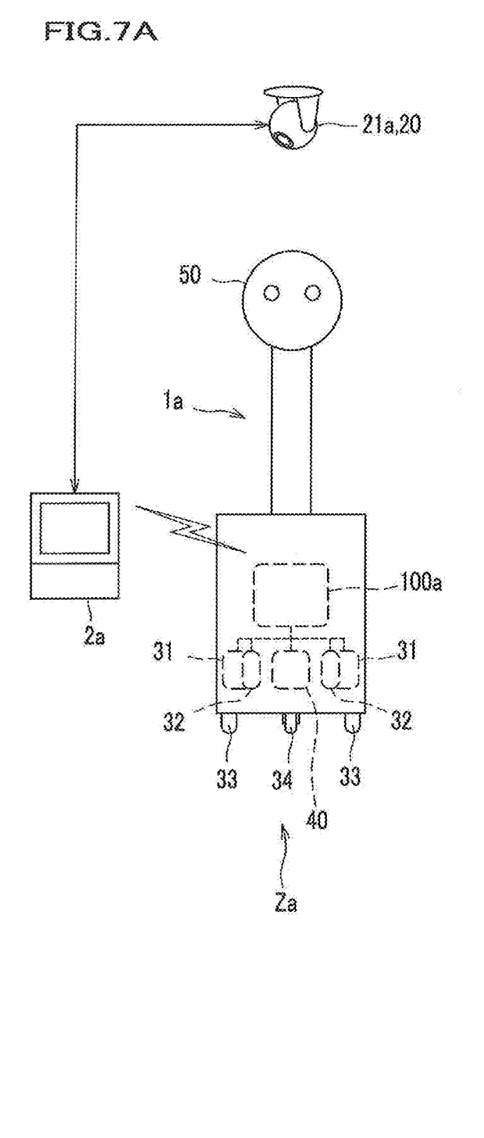
FIGS. 7A and 7B are general views of an autonomous movement system according to the second embodiment.
Figure 7B:
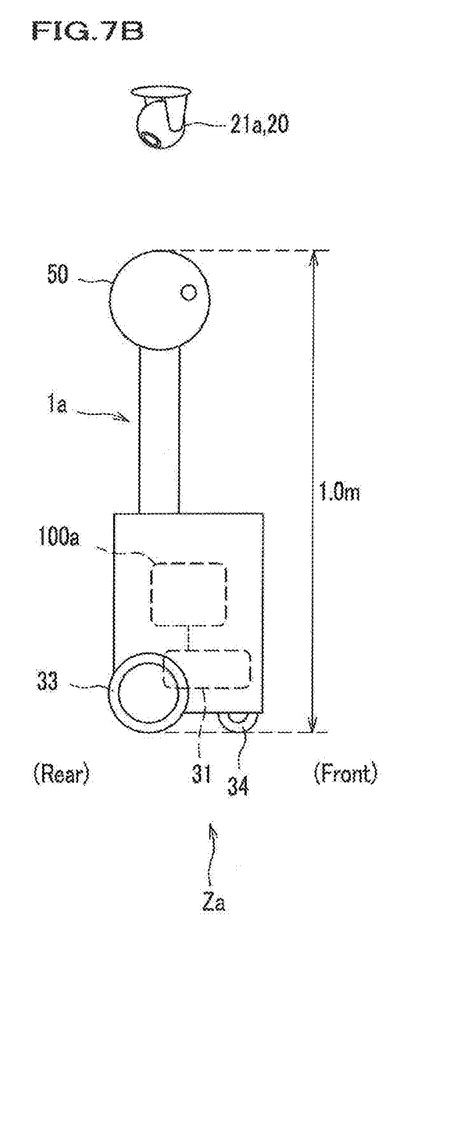

FIGS. 7A and 7B are general views of an autonomous movement system according to the second embodiment. FIG. 7A shows a front view of the autonomous mobile device and the data input unit 2*a*, and FIG. 7B shows only a side view of the autonomous mobile device.

A difference of the autonomous movement system Za in FIGS. 7A and 7B from the autonomous movement system Z in FIG. 3 is described as follows:
(b1) The environment recognizing unit 20 is not provided in an autonomous mobile device 1*a*, but installed in the environment as a ceiling camera 21*a*. An image captured by the ceiling camera 21*a* is inputted into the data input unit 2*a* as the environment data.
(b1) The autonomous mobile device 1*a* includes a position indicator 50.

The motors 31, the encoders 32, the driving wheels 33, the caster 34, the battery 40 are the same as those in the first embodiment, and thus their descriptions are omitted. Further, the data input unit 2*a* has been described regarding FIG. 6, and thus the description is omitted. Further, the control unit 100*a* has been described regarding FIG. 6, and thus the description is omitted.

The ceiling camera 21*a* as the environment recognizing unit 20 is a camera installed at a ceiling in the environment. Further, when the movable region is broad, a plurality of the ceiling cameras 21*a* may be installed at a constant interval. Further, it is enough for the ceiling camera 21*a* to be installed at a position which allows the ceiling camera 21*a* to overlooks the environment, and for example, may have a shape to be hanged by a hanging means. Further, it is assumed that the the ceiling camera 21*a* is fixed, but may be movable by a mobile hanging means.

The image (picture) captured by the ceiling camera 21*a* is transmitted to the data input unit 2*a* by wires or radio wave communication. The data input unit 2*a* analyzes a traveling environment from the image (picture) inputted from the ceiling camera 21*a* (the environment recognizing unit 20) by a method described later with respect to FIG. 8 and transmits the analysis result to the control unit 100*a* through a radio wave LAN, etc.

The position indicator 50 is a device for indicating a position of the autonomous mobile device 1 relative to the circumference. A height of the position indicator 50 is about 1.0 m to match to a height of a child. However, the height is not limited to this height.

Figure 8:
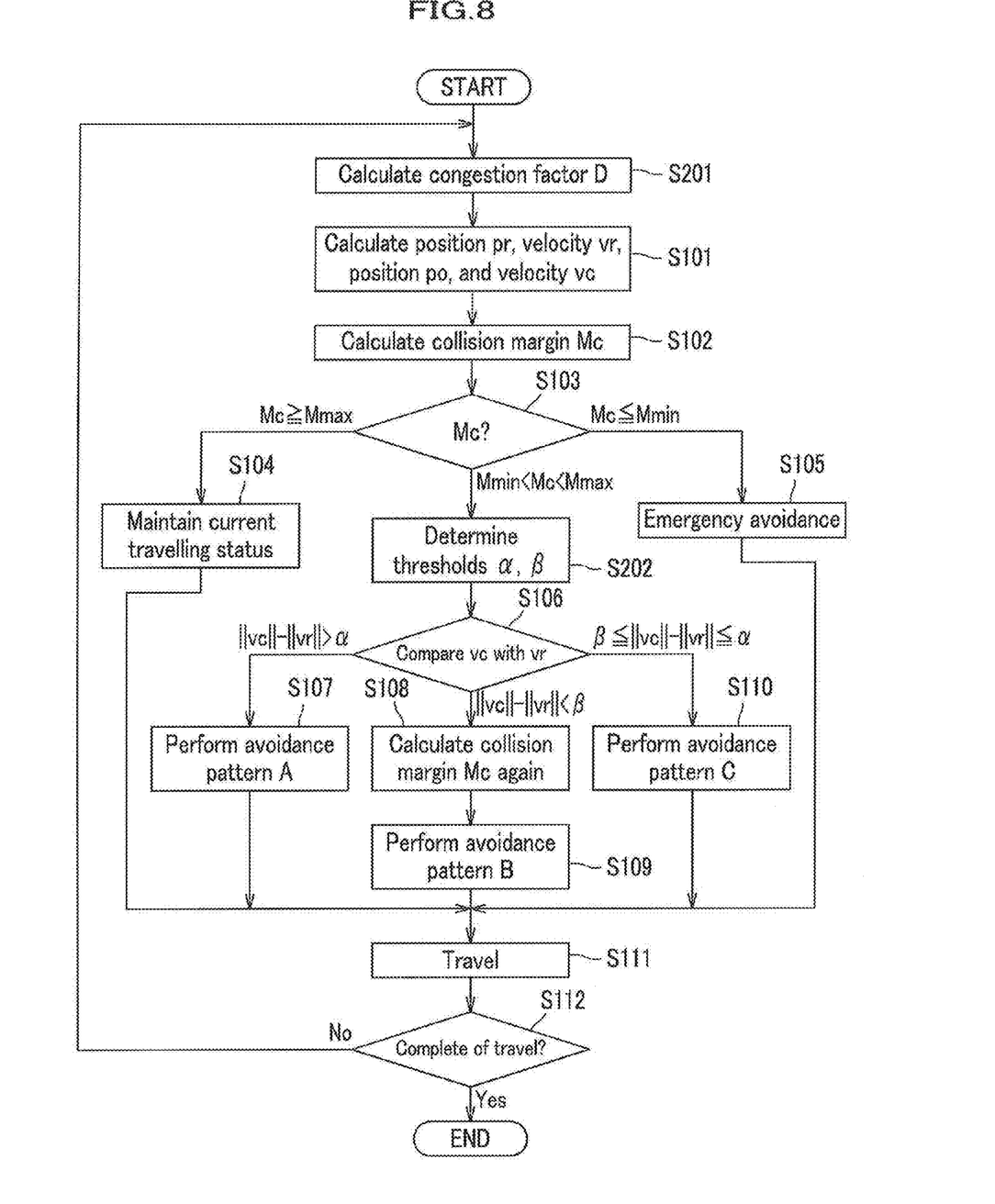
FIG. 8 is a flowchart illustrating a processing procedure of the autonomous mobile device according to the second embodiment.

FIG. 8 is a flowchart illustrating a processing procedure of the autonomous mobile device according to the second embodiment. In FIG. 8, similar processes to those in FIG. 3 are designated with the same step numbers, and thus descriptions are omitted. Accordingly only different processes are described.

First, when the process is started, the moving environment analyzing unit 212 calculates a congestion factor D (S201) and transmits the congestion factor D to the control unit 100*a*.

After that, the self data estimating unit 112 calculates the one's own position pr, the one's own velocity vr, the position of distance data point po, and the velocity of the mobile obstacle vc (S101).

As the result of the step S103, when Mmin<Mc<Mmax (S104→Mmin<Mc<Mmax), the congestion factor processing unit 117 determines the thresholds $\alpha, \beta$ on the basis of the calculated congestion factor D (S202).

For example, when the congestion factor D is smaller than a reference value Dmin (a reference value for determining that a moving environment is sufficiently vacant), because it is not frequent that the same stepping occurs, the congestion factor processing unit 117 sets both the $\alpha, \beta$ to be larger. This allows the avoidance pattern B to be frequently selected.

Further, when the congestion factor D is larger than a reference value Dmax (a reference for determining that the moving environment is extremely crowded), the congestion factor processing unit 117 sets the $\beta$ to be small because the turning of the autonomous mobile device 1*a* remarkably blocks flows of other mobile obstacles. This allows the avoidance patterns A, C to be frequently selected.

After the step S202, the avoidance pattern determining unit 115 performs a process which is similar to the process from the step S107 to S112 in FIG. 3 using the determined threshold values $\alpha, \beta$.

As described above, the autonomous mobile device 1*a* can be provided to determine the avoidance pattern in accordance with a selection reference set in accordance with the congestion factor of the mobile environment.

[Calculate the Congestion Factor]

Figure 9A:
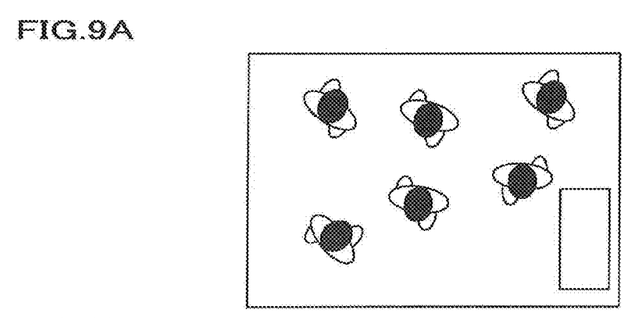
FIGS. 9A to 9C are drawings illustrating a detailed method of calculating a congestion factor according to the second embodiment.
Figure 9B:
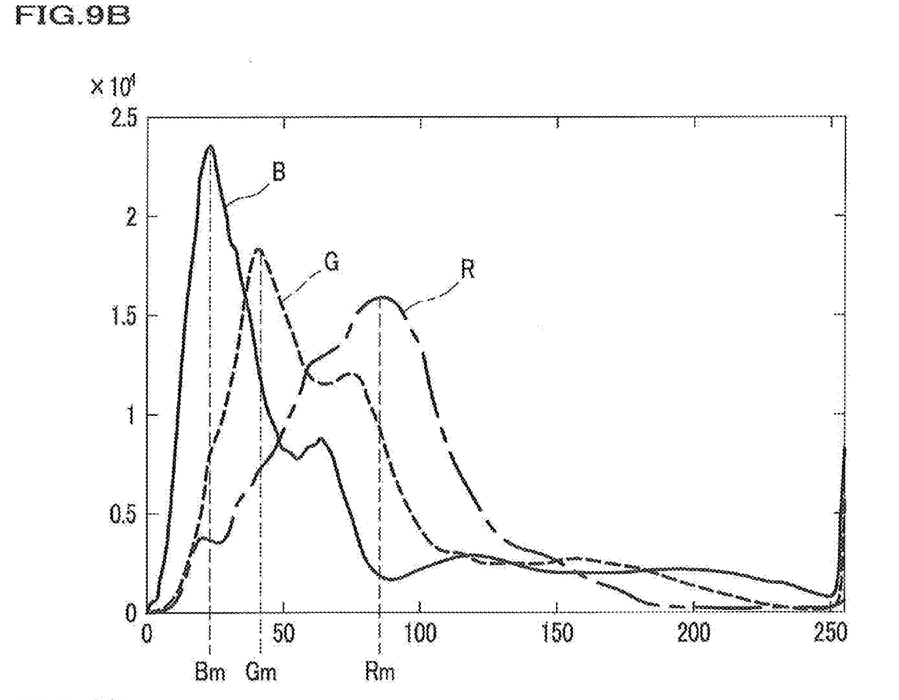
Figure 9C:
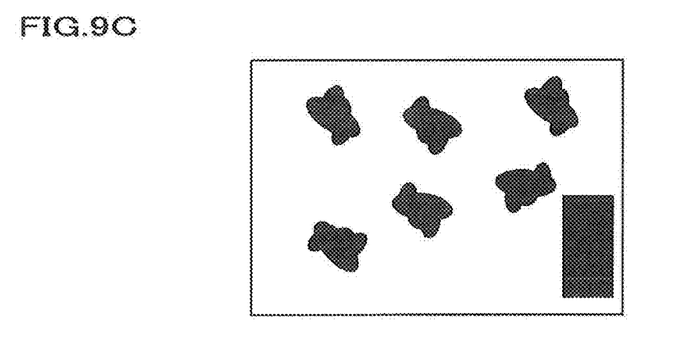

FIGS. 9A to 9C are drawings illustrating a detailed method of calculating a congestion factor according to the second embodiment.

First, the image much including a floor part as shown in FIG. 9A selected from the captured images from a plurality of the ceiling cameras 21*a* (see FIG. 6). The selection may be performed, for example, manually by the user. The moving environment analyzing unit 212 generates histograms in intensities of RGB (Red Green Blue) as shown in FIG. 9B from the selected captured image. A color near respective peaks of RGB is estimated as a color of the floor. Then, the moving environment analyzing unit 212 determines that a floor color Qf is defined by the RGB intensity satisfying Eq. (4) on the basis of the generated histograms.

$$Qf=\{C|Rm-\Delta Rl<R<Rm+\Delta Rr \cap Gm-\Delta Gl<G<Gm+\Delta Gr \cap Bm-\Delta Bl<B<Bm+\Delta Br\} \quad (4)$$

When the environment is always constant in the Qf, the Qf may be previously extracted and stored in the memory 210 of the data input unit data input unit 2a and the memory 110a of the autonomous mobile device 1a.

Next, the moving environment analyzing unit 212 extracts parts having colors other than the floor color Qf from a predetermined image captured by the ceiling camera 21a. As described above, the moving environment analyzing unit 212 extracts regions having colors other than the floor color Qf in the captured image as shown in FIG. 9C, i.e., objects other than the floor (that is, obstacles). The extracted obstacles include both the stationary obstacles and the mobile obstacles. The moving environment analyzing unit 212 calculates the congestion factor D of the moving environment quantitatively by calculating a ratio of the region occupied by the objects (obstacles) other than the floor within the captured image.

[Acquiring Method of Position and Velocity]

Figure 10A:
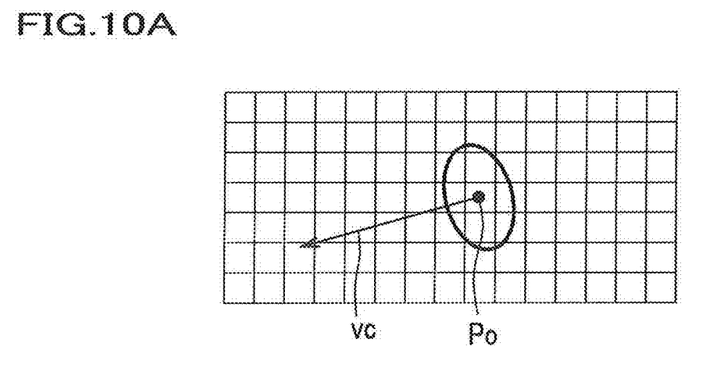
Figure 10B:
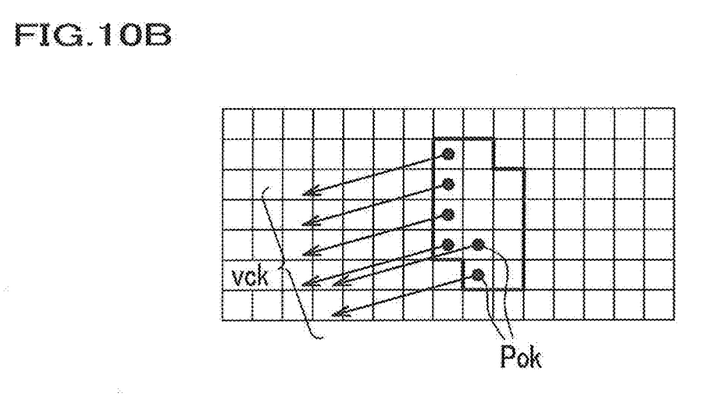

FIG. 10 shows views illustrating a detailed method of acquiring a position and a velocity of the mobile obstacle according to the second embodiment.

In the technology described in the first embodiment, the position and the velocity of the mobile obstacle are calculated in which the shape point train is provided by the LIDAR 21 as a target. The technology of the second embodiment uses the ceiling camera 21a. Accordingly, it is necessary to calculate again the shape point train by the LIDAR 21.

Then, in the second embodiment, the moving environment analyzing unit 212 classifies pixels in the captured image at time t into a floor and parts other than the floor using the method shown in FIGS. 9A to 9C. After that, the image classified into the floor and other part is transmitted to the control unit 100a. The obstacle data estimating unit 213 determines that adjoining pixels classified as the part other than the floor are of the same obstacle and divides the pixels into segments as shown in FIG. 10A. In other words, the obstacle data estimating unit 213 performs grouping of the pixels to generate the segments.

The obstacle data estimating unit 213 extracts characteristic quantities of a representative position, a color, a size, etc. from the divided segment. The obstacle data estimating unit 213 stores the extracted characteristic quantities in the memory 110a as a list. After that, the obstacle data estimating unit 213 performs the same process to image captured after a minute time period of Δt seconds, determines that the pixels having the similar characteristic quantities as the same object, and obtains the velocity vc of the object from the variation quantity of the representative positions. The representative positions are, as shown by FIG. 10A, determined as the segment center po.

As shown in FIG. 10B, the obstacle data estimating unit 213 assigns regions occupied by the obstacles to the grids having a roughness to such an extent that the size is negligible, and provides velocities vck, positions pok to respective grids to be stored in the memory 110a. It is general that the velocities vck and the positions pok are those at a center of the grid as shown in FIG. 10B, respectively, but not limited to the center. The velocity vck, and the position pok correspond to vck and pok in FIG. 5, respectively. As described above, the collision margin processing unit 114 can calculate the collision margin by the method described regarding FIG. 5.

As described above, the collision margin processing unit 114 can calculate the collision margin by the same method as the first embodiment. More specifically, the obstacle data estimating unit 213 can use the same method as FIG. 5 by providing the velocity data and position data to the grid as shown in FIG. 10B. The roughness of the grids may be preferably set by the user in accordance with the size or travelling performance of the autonomous mobile device 1a.

According to the second embodiment, the thresholds for the avoidance patterns are changed in accordance with the congestion factor, so that the avoidance pattern according to the environment can be selected.

Others

The autonomous mobile devices 1 and 1a in the first and second embodiments determines the avoidance patterns based on the actual velocity of the mobile obstacle. The types of the moving objects may be distinguished on the basis of the images captured by the camera. Further the controller 111 of the autonomous mobile devices 1 and 1a may estimate the velocity of the facing object (motor ability) relative to oneself on the basis of the types of the moving object. The controller 111 classified the facing mobile obstacle, into, for example, an aged person having a stick, an injured person, a person pushing a carrier, and a person looking the other way, etc. The controller 111 determines that these persons have motor abilities which are lower than one's own motor ability. In other words, the controller 111 determines that these persons'velocities are slower than one's own velocity. On the other hand, the controller 111 determines that, for example, a normal adult male and a running person have high motor abilities. In other words, the controller 111 determines that a persons' velocities are faster than one's own velocity.

As described above, for example, the autonomous mobile devices 1, 1a can distinguish between a healthy person walking slowly, i.e., person having a high obstacle avoidance capability, and a person having a low obstacle avoidance capability.

In addition, the autonomous mobile devices 1, 1a change one's own avoidance pattern in accordance with a motion state of the mobile obstacle. However, the technology described in Patent Document 1 performs avoidance on the basis of the motion status which is not related to oneself and thus different from the technology described in the embodiments of the invention.

DESCRIPTION OF REFERENCE SYMBOLS 1, 1a autonomous mobile device
2, 2a data input unit
20 environment recognizing unit
21 LIDAR laser imaging detection and Ranging)
21a ceiling camera
30 travelling unit
31 motor
32 encoder
33 driving wheel
34 caster
40 battery
100, 100a control unit
100 memory
111 controller 112 self data estimating unit
113 obstacle data estimating unit
114 collision margin processing unit
115 avoidance pattern determining unit
116 travelling control unit
117 congestion factor processing unit
210 memory
20 control unit
212 moving environment analyzing unit
213 obstacle data estimating unit
Z, Za autonomous movement system

The invention claimed is:

1. An autonomous mobile device comprising:
an environment recognizing unit configured to recognize a plurality of mobile obstacles, including a first mobile obstacle,
an avoidance pattern determining unit configured to determine an avoidance pattern-and determine a travelling pattern for the autonomous mobile device in accordance with a motion status of the first mobile obstacle relative to the autonomous mobile device;
a travelling control unit configured to cause the autonomous mobile device to travel in accordance with the travelling pattern determined by the avoidance pattern determining unit;
wherein the avoidance pattern determining unit determines the travelling pattern comprises maintaining a motion direction of the autonomous mobile device when a value obtained by subtracting a velocity of the autonomous mobile device from a velocity of the mobile obstacle is equal to or greater than a first value; and
the first value is determined in accordance with a congestion factor of the plurality of the mobile obstacles.

2. The autonomous mobile device as claimed in claim 1, wherein the avoidance pattern determining unit determines the travelling pattern comprises changing direction of the autonomous mobile device when the value obtained by subtracting the velocity of the autonomous mobile device from the velocity of the first mobile obstacle is less than a second value, and wherein the first value is greater than the second value.

3. The autonomous mobile device as claimed in claim 2, wherein the second value is determined in accordance with the congestion factor of the plurality of the mobile obstacles.

4. The autonomous mobile device as claimed in claim 1, wherein the avoidance pattern determining unit determines the travelling pattern comprises providing deceleration of the autonomous mobile device when the value obtained by subtracting the velocity of the autonomous mobile device from the velocity of the first mobile obstacle is within a predetermined range.

5. The autonomous mobile device as claimed in claim 1, wherein the avoidance pattern determining unit determines the travelling pattern comprises providing deceleration of the autonomous mobile device when the value obtained by subtracting the velocity of the autonomous mobile device from the velocity of the first mobile obstacle is smaller than the first value and larger than a second value.

6. The autonomous mobile device as claimed in claim 5, wherein the second value is determined in accordance with the congestion factor of the plurality of the mobile obstacles.

7. The autonomous mobile device as claimed in claim 1, wherein the environment recognizing unit comprises a camera capturing a front view, wherein the avoidance pattern determining unit estimates the motion status of the first mobile obstacle in accordance with a type of the first mobile obstacle in an image captured by the camera.

8. An autonomous mobile system comprising:
an environment recognizing unit configured to recognize a plurality of mobile obstacles, including a first mobile obstacle,
an autonomous mobile device having an avoidance pattern determining unit configured to determine an avoidance pattern and determine a travelling pattern for the autonomous mobile device in accordance with a motion status of the first mobile obstacle relative to the autonomous mobile device; and
a travelling control unit configured to cause the autonomous mobile device to travel in accordance with the travelling pattern determined by the avoidance pattern determining unit;
wherein the avoidance pattern determining unit determines the avoidance pattern comprises maintaining a motion direction of the autonomous mobile device when a value obtained by subtracting a velocity of the autonomous mobile device from a velocity of the first mobile obstacle is equal to or greater than a first value; and
the first value is determined in accordance with a congestion factor of the plurality of the mobile obstacles.

9. The autonomous mobile system as claimed in claim 8, further comprising a data processing unit configured to calculate the congestion factor of the plurality of mobile obstacles, wherein
the autonomous mobile device changes a reference of a motion status in accordance with the congestion factor calculated by the data processing unit and determines the travelling pattern on the basis of the changed reference.

10. An autonomous movement method by an autonomous mobile device performing an autonomous travelling comprising:
recognizing, by an environment recognizing unit, a plurality of mobile obstacles, including a first mobile obstacle,
determining whether or not the autonomous mobile device avoids the first mobile obstacle;
determining a travelling pattern of the autonomous mobile device in accordance with a motion status of the first mobile obstacle relative to the autonomous mobile device; and
causing the autonomous mobile device to travel in accordance with the determined travelling pattern;
wherein the travelling pattern comprises maintaining a motion direction of the autonomous mobile device when a value obtained by subtracting a velocity of the autonomous mobile device from a velocity of the first mobile obstacle is equal to or greater than a first value; and
the first value is determined in accordance with a congestion factor of the plurality of mobile obstacles.

* * * * *